(12) United States Patent
Ueda et al.

(10) Patent No.: US 11,703,580 B2
(45) Date of Patent: Jul. 18, 2023

(54) ULTRASONIC SENSOR AND RETAINER

(71) Applicant: DENSO CORPORATION, Kariya (JP)

(72) Inventors: Keisuke Ueda, Kariya (JP); Takeo Tsuzuki, Kariya (JP); Taketo Harada, Kariya (JP); Mitsuyasu Matsuura, Nisshin (JP)

(73) Assignee: DENSO CORPORATION, Kariya (JP)

( * ) Notice: Subject to any disclaimer, the term of this patent is extended or adjusted under 35 U.S.C. 154(b) by 405 days.

(21) Appl. No.: 16/882,903

(22) Filed: May 26, 2020

(65) Prior Publication Data

US 2020/0284890 A1   Sep. 10, 2020

Related U.S. Application Data

(63) Continuation of application No. PCT/JP2018/039031, filed on Oct. 19, 2018.

(30) Foreign Application Priority Data

Nov. 27, 2017 (JP) .................................. 2017-227063
Aug. 24, 2018 (JP) .................................. 2018-157614

(51) Int. Cl.
*G01S 7/521* (2006.01)
*H04R 1/00* (2006.01)
(Continued)

(52) U.S. Cl.
CPC .............. *G01S 7/521* (2013.01); *B60R 19/52* (2013.01); *B60R 21/00* (2013.01); *H04R 1/00* (2013.01); *H04R 17/02* (2013.01); *B60R 19/02* (2013.01)

(58) Field of Classification Search
CPC ......... G01S 7/521; B60R 19/52; B60R 21/00; B60R 19/02; H04R 1/00; H04R 17/02
See application file for complete search history.

(56) References Cited

U.S. PATENT DOCUMENTS

2014/0346303 A1   11/2014 Hirakawa et al.
2014/0347962 A1*  11/2014 Baumann .............. B60R 19/483
                                                367/188
(Continued)

FOREIGN PATENT DOCUMENTS

JP   H02-027665 U   2/1990
JP   H02-032524 U   2/1990
(Continued)

*Primary Examiner* — Andrew L Sniezek
(74) *Attorney, Agent, or Firm* — Maschoff Brennan

(57) ABSTRACT

An ultrasonic sensor includes a sensor body, a cushion member, a retainer unit, and a drainage path. The sensor body includes an ultrasonic microphone and a microphone support unit which allows a protruding part of the ultrasonic microphone located at a distal end in an axial direction to protrude and supports the protruding part. The cushion member covers the protruding part. The retainer unit allows exposure of a portion of the cushion member that is located at the distal end in the axial direction, and a portion of the cushion member that is located at a proximal end in the axial direction is sandwiched between the retainer unit and an outer peripheral surface of the protruding part. The drainage path penetrates the retainer unit in a radial direction to allow water to be discharged out of the retainer unit from a gap between the retainer unit and the cushion member.

24 Claims, 9 Drawing Sheets

(51) Int. Cl.
*H04R 17/02* (2006.01)
*B60R 21/00* (2006.01)
*B60R 19/52* (2006.01)
*B60R 19/02* (2006.01)

(56) References Cited

U.S. PATENT DOCUMENTS

2016/0116330 A1\* 4/2016 Oba .................. G01S 7/521
73/632
2021/0170968 A1\* 6/2021 Ueda .................. G01S 15/931

FOREIGN PATENT DOCUMENTS

| | | |
|---|---|---|
| JP | H07-035846 A | 2/1995 |
| JP | 2000-125378 A | 4/2000 |
| JP | 3999187 B2 | 10/2007 |
| JP | 2010-208557 A | 9/2010 |
| JP | 2017-175291 A | 9/2017 |

\* cited by examiner

ULTRASONIC SENSOR AND RETAINER

CROSS-REFERENCE TO RELATED APPLICATION

This application claims the benefit of priority from Japanese Patent Application No. 2017-227063 filed Nov. 27, 2017 and Japanese Patent Application No. 2018-157614 filed Aug. 24, 2018, the descriptions of which are incorporated herein by reference.

BACKGROUND

Technical Field

The present disclosure relates to an ultrasonic sensor and a retainer which is a component for attaching and fixing the ultrasonic sensor to an auto body component.

Related Art

A mounting structure for an ultrasonic sensor is disclosed in which the performance thereof is not adversely affected by infiltration of water or the like.

SUMMARY

As an aspect of the present disclosure, an ultrasonic sensor is configured to be attached to an auto body component. The ultrasonic sensor includes: a sensor body including an ultrasonic microphone having a columnar shape and extending along an axial direction parallel to a central axis line and a microphone support unit which allows a protruding part of the ultrasonic microphone to protrude and supports a supported part of the ultrasonic microphone, the protruding part being located at a distal end in the axial direction, the supported part being located at a proximal end in the axial direction; a cushion member provided to cover the protruding part of the ultrasonic microphone and formed in a cylindrical shape from a synthetic resin-based elastic material; a retainer unit provided outward of the ultrasonic microphone in a radial direction extending from the central axis line, the retainer unit being configured so that an exposed part of the cushion member is exposed and a sandwiched part of the cushion member is sandwiched between the retainer unit and an outer peripheral surface of the protruding part of the ultrasonic microphone, the exposed part being located at the distal end in the axial direction, the sandwiched part being located at the proximal end in the axial direction; and a drainage path penetrating the retainer unit in the radial direction to allow water to be discharged out of the retainer unit from a gap between the retainer unit and the cushion member.

DETAILED DESCRIPTION OF THE PREFERRED EMBODIMENTS

Figure 1:
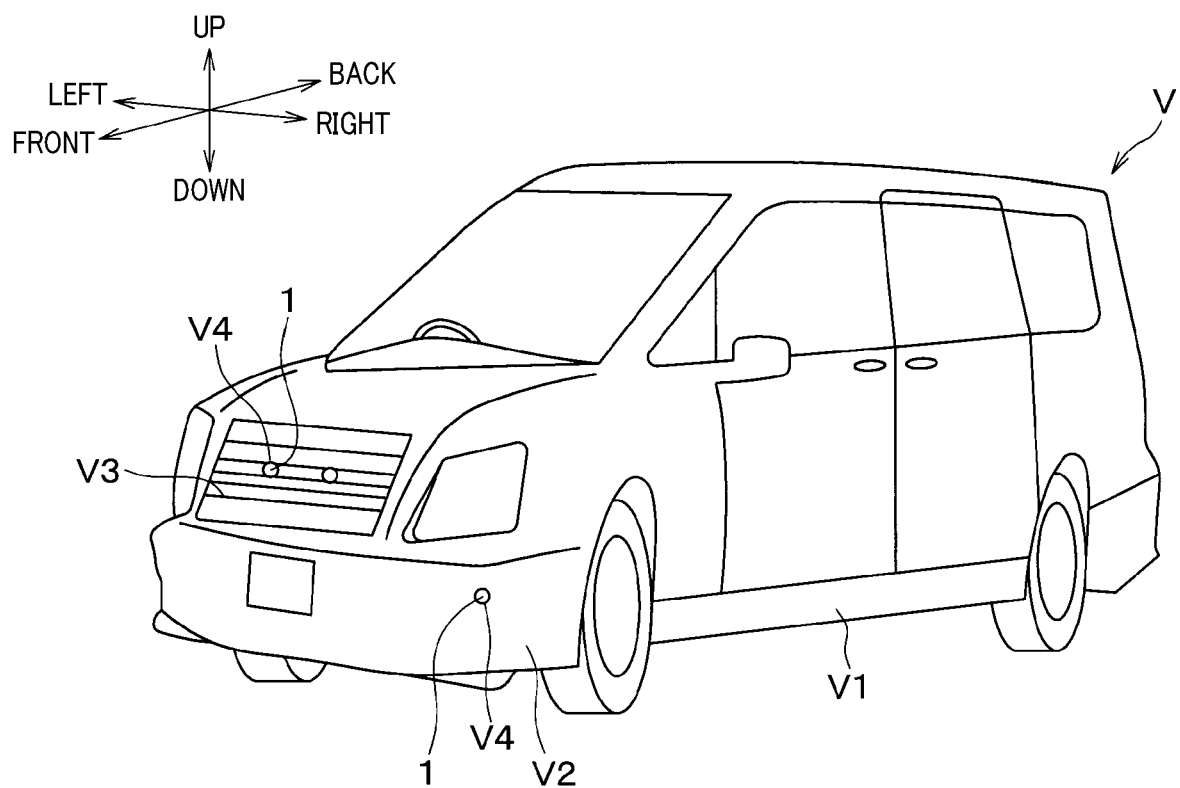
FIG. 1 is an external view of a vehicle in which an ultrasonic sensor according to an embodiment is installed.

JP 3999187 B discloses a mounting structure for an ultrasonic sensor in which the performance thereof is not adversely affected by infiltration of water or the like. Specifically, in the mounting structure disclosed in JP 3999187 B, a hole is formed in an outer plate exposed on the exterior, and the ultrasonic sensor is inserted into this hole. A rib for fixing the ultrasonic sensor is provided to an inner surface of the outer plate. The ultrasonic sensor is fixed to this rib via a vibration dampener. The outer plate, the rib, or the vibration dampener has a drainage hole vertically below the ultrasonic sensor. The drainage hole is connected to a space formed between a casing for the ultrasonic sensor and the outer plate, the rib, or the vibration dampener.

A known in-vehicle ultrasonic sensor is primarily attached to a bumper. This means that for a known in-vehicle ultrasonic sensor, the aforementioned "outer plate" is primarily a bumper. In the case where the ultrasonic sensor is attached to the bumper, providing a waterproof structure at an attachment portion is relatively easy. Therefore, in this case, the amount of water infiltration at the attachment portion is relatively small. Furthermore, even if water infiltration occurs, good drainage is possible through the aforementioned drainage hole.

Meanwhile, there can be cases where the in-vehicle ultrasonic sensor is attached to a front grille for reasons of obstacle sensing performance, vehicle designs, or the like. In these cases, providing the aforementioned drainage hole in the front grille is difficult from the design or structural perspective. If incoming water is retained at a portion where the ultrasonic sensor is attached to an auto body component such as the bumper or the front grille, the propagation of vibration through the retained water may cause an increase in unnecessary reflected waves, causing problems such as false detection.

The present disclosure is conceived in view of the above-cited circumstances and so on. Specifically, the present disclosure provides a configuration of an ultrasonic sensor which is configured to be attachable to an auto body component and in which degradation in the performance of the in-vehicle ultrasonic sensor that is caused by infiltration of water due to rain or the like can be sufficiently suppressed.

Hereinafter, an embodiment will be described with reference to the drawings. For the purpose of illustration, the forward, backward, left, right, upward, and downward directions in the configuration according to the present embodiment are defined by arrows in the drawings. Note that various applicable variations of one embodiment will be collectively described after the description of the embodiment because insertion of such variations into the sequential description about the embodiment may inhibit understanding of the embodiment.

Configuration

In FIG. 1, a vehicle V is what is called a four-wheeled vehicle and includes a vehicle body V1 which is substantially rectangular in a plan view. A bumper V2 and a front grille V3 which are auto body components are attached to a front end portion of the vehicle body V1. The front grille V3 is disposed above the bumper V2. Note that the vertical direction herein is defined assuming an installed-in-vehicle state in which an ultrasonic sensor 1 is attached to the front grille V3. Therefore, the vertical direction in the description of the configuration of each part of the ultrasonic sensor 1 is premised on an attitude in the installed-in-vehicle state.

A fitting hole V4 which is a through-hole for fitting the ultrasonic sensor 1 is formed in each of the bumper V2 and the front grille V3. Specifically, in the present embodiment, fitting holes V4 are provided at both corner portions of the bumper V2. Furthermore, two fitting holes V4 are symmetrically provided in the front grille V3.

The ultrasonic sensor 1 is configured to be attached to each of the bumper V2 and the front grille V3. Hereinafter, with reference to FIGS. 2 and 3, details of the configuration of the ultrasonic sensor 1 that is attached to the front grille V3 will be described.

Figure 2:
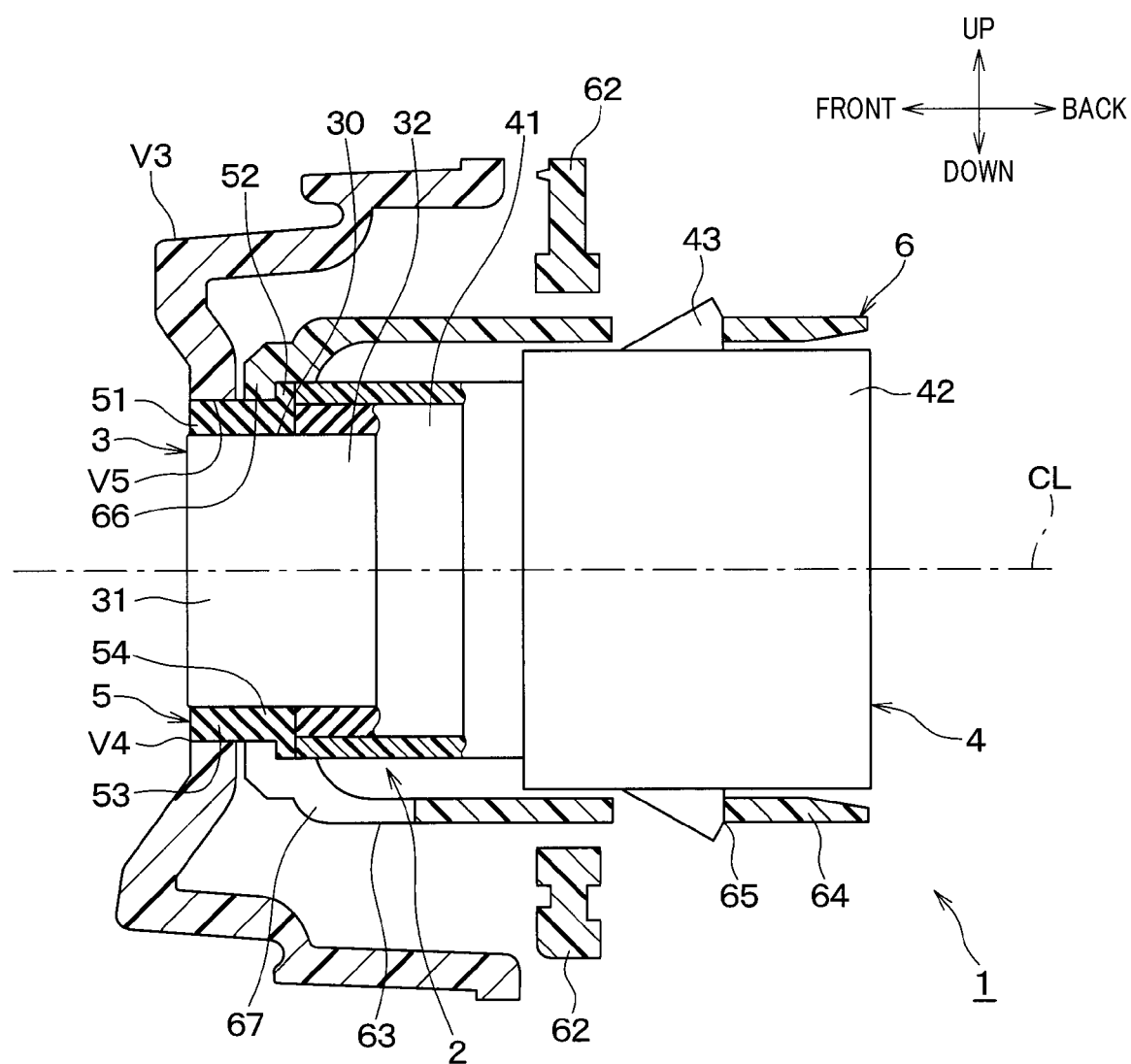
FIG. 2 is a lateral cross-sectional view of the ultrasonic sensor illustrated in FIG. 1.

In FIG. 2, a sensor body 2 constituting the body part of the ultrasonic sensor 1 includes an ultrasonic microphone 3 and a microphone support unit 4. Furthermore, in the present embodiment, a cushion member 5 and a retainer unit 6 are included as components for fitting the ultrasonic sensor 1 to the front grille V3.

The ultrasonic microphone 3 is configured to be able to transmit and receive ultrasonic waves. Specifically, the ultrasonic microphone 3 is configured to transmit probe waves along a directional axis and receive reflected waves from an object located near the vehicle V.

The ultrasonic microphone 3 has a columnar contour having a central axis line CL parallel to the directional axis. Specifically, in the present embodiment, the ultrasonic microphone 3 is formed in the shape of a circular column extending along an axis parallel to the central axis line CL. In other words, the ultrasonic microphone 3 has an outer peripheral surface 30 which is a cylindrical surface having a generatrix parallel to the central axis line CL.

The ultrasonic microphone 3 includes a protruding part 31 and a supported part 32. The protruding part 31 is a distal end portion of the ultrasonic microphone 3 in the axial direction and protrudes forward from the microphone support unit 4. The wording "the distal end . . . in the axial direction" indicates a front area of the ultrasonic sensor 1, specifically, the sensor body 2, in the drawings in which the ultrasonic microphone 3 protrudes. The supported part 32 is a proximal end portion of the ultrasonic microphone 3 in the axial direction and is embedded within the microphone support unit 4. The wording "the proximal end . . . in the axial direction" indicates the area opposite to the area indicated by the wording "the distal end . . . in the axial direction".

The microphone support unit 4 includes an elastic support member 41 and a sensor case 42. The elastic support member 41 is formed from a synthetic resin-based elastic material such as silicone rubber so as to elastically support the supported part 32 of the ultrasonic microphone 3. Specifically, the elastic support member 41 has a bottomed cylindrical contour that is open toward the distal end in the axial direction and is configured to house the supported part 32 of the ultrasonic microphone 3 in an inner space.

The sensor case 42 is integrally formed from a hard synthetic resin such as polybutylene terephthalate. The sensor case 42 is configured to house the elastic support member 41 at the distal end portion in the axial direction while covering the outer peripheral surface of the elastic support member 41. In other words, the microphone support unit 4 is configured to elastically support the supported part 32 of the ultrasonic microphone 3 at the proximal end in the axial direction while allowing the protruding part 31 of the ultrasonic microphone 3 at the distal end in the axial direction to protrude.

The sensor body 2 is formed in the shape of a stepped column in which the ultrasonic microphone 3 protruding, from the sensor case 42, toward the distal end in the axial direction is a reduced diameter portion. A plurality of engagement protrusions 43 are provided on the sensor case 42. The engagement protrusions 43 vertically protrude from the outer peripheral surface of the sensor case 42.

The cushion member 5 is provided to cover the protruding part 31 of the ultrasonic microphone 3 in close contact. The cushion member 5 is seamlessly integrally formed from a synthetic resin-based elastic material such as silicone rubber. The synthetic resin-based elastic material is also referred to as a viscoelastic material or an elastomer.

The cushion member 5 is configured to be sandwiched between the outer peripheral surface 30 of the ultrasonic microphone 3 and an inner peripheral surface V5 of the fitting hole V4 when the protruding part 31 of the ultrasonic microphone 3 is inserted into the fitting hole V4. In the present embodiment, the cushion member 5 includes a cylindrical part 51 and a flange part 52.

The cylindrical part 51 is a circular cylindrical part provided along the central axis line CL and has an inner peripheral surface like the inner surface of a circular cylinder. This inner peripheral surface is formed so as to closely contact a portion of the outer peripheral surface 30 of the ultrasonic microphone 3 that corresponds to the protruding part 31. The flange part 52 is formed in the shape of a ring protruding outward in a radial direction from a proximal end portion, i.e., a rear end portion, of the cylindrical part 51 in the axial direction. The wording "radial direction" means directions radially extending from the central axis line CL.

A state where the cushion member 5 and the retainer unit 6 are temporarily attached to the sensor body 2 before the ultrasonic sensor 1 is attached to the front grille V3 is referred to as a temporarily assembled state. Note that "the temporarily assembled state" is defined for the sake of description of the positional relationship between the respective parts of the ultrasonic sensor 1. Therefore, there is not always this temporarily assembled state upon attaching the ultrasonic sensor 1 to the front grille V3.

In the temporarily assembled state, an exposed part 53 of the cushion member 5 which is located at the distal end in the axial direction is exposed from the retainer unit 6. Furthermore, this exposed part 53 is in close contact with the inner peripheral surface V5 of the fitting hole V4 in the installed-in-vehicle state. A sandwiched part 54 of the cushion member 5 which is located at the proximal end in the axial direction is a portion that locks with the retainer unit 6 in the temporarily assembled state and the installed-in-vehicle state and includes the flange part 52 and the proximal end portion of the cylindrical part 51 in the axial direction.

The retainer unit 6 is a component used to attach the ultrasonic sensor 1, specifically, the sensor body 2, to the front grille V3, and is disposed outward of the ultrasonic microphone 3 and the microphone support unit 4 in the radial direction in the temporarily assembled state and the installed-in-vehicle state. In the present embodiment, the retainer unit 6 is configured so that the exposed part 53 of the cushion member 5 which is located at the distal end in the axial direction is exposed and the sandwiched part 54 of the cushion member 5 which is located at the proximal end in the axial direction is sandwiched between the retainer unit 6 and a portion of the outer peripheral surface 30 of the ultrasonic microphone 3 that corresponds to the protruding part 31. Note that the retainer unit 6 is also referred to as "the retainer member 6" or "the retainer 6".

Figure 3:
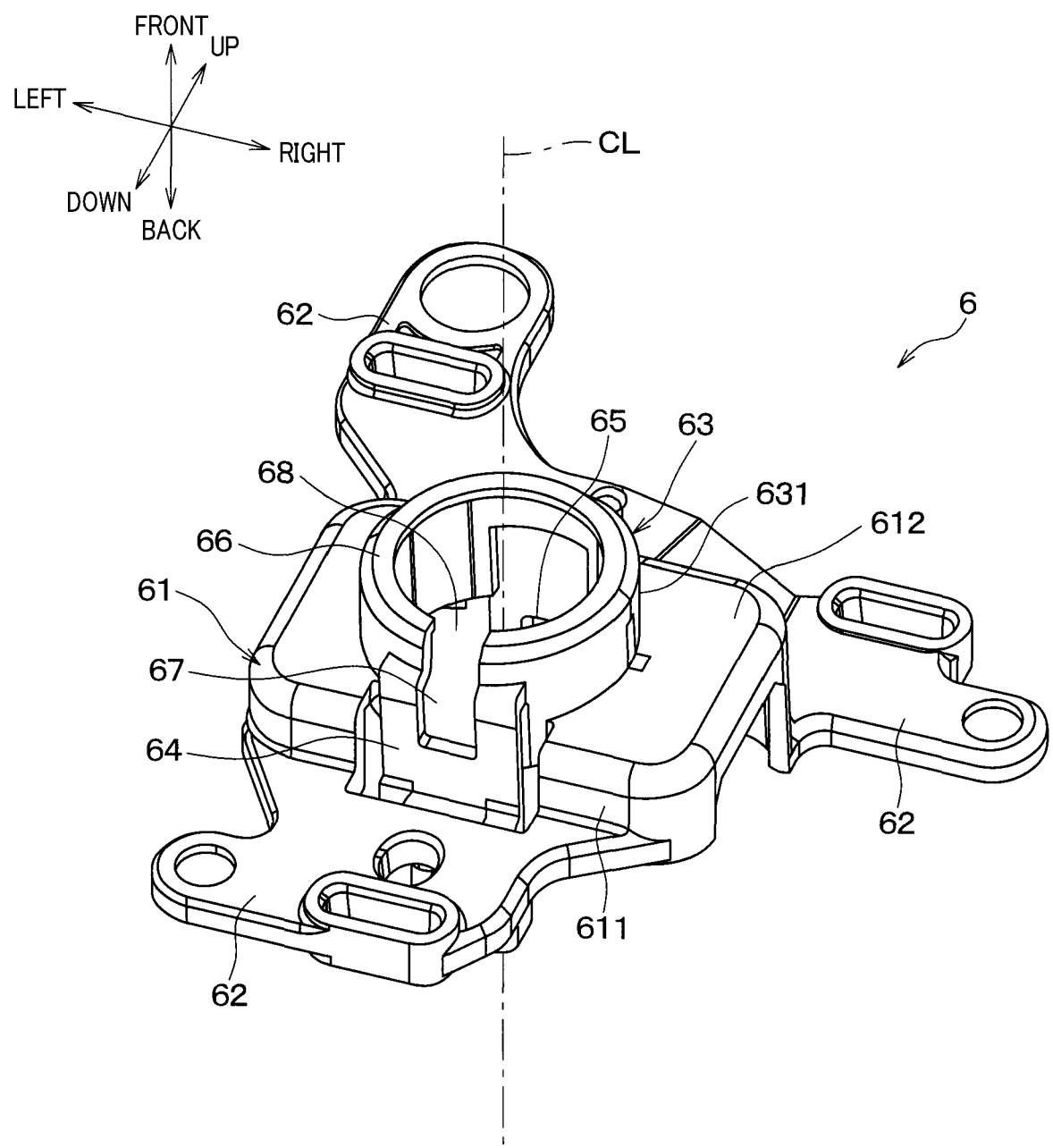
FIG. 3 is a perspective view illustrating an external appearance of a retainer unit illustrated in FIG. 2.

The retainer unit 6 is integrally formed from a hard synthetic resin such as an acrylonitrile butadiene styrene (ABS) resin. In FIGS. 2 and 3, the retainer unit 6 includes a body holding part 61, an auto body fixing part 62, a microphone facing part 63, and an engagement piece 64.

The body holding part 61 is formed in the shape of a bottomed rectangular cylinder that is open rearward. In other words, the body holding part 61 is configured to cover, in the temporarily assembled state and the installed-in-vehicle state, a portion of the sensor case 42 that is located at the distal end in the axial direction.

The auto body fixing part 62 is provided so as to be fixed to the front grille V3 by a fixing means such as welding or screwing upon attaching the ultrasonic sensor 1 to the front grille V3. In the present embodiment, in the retainer unit 6, a plurality of auto body fixing parts 62 radially extend outward in the radial direction from the central axis line CL.

The auto body fixing part 62 extends from a rectangular cylindrical side wall part 611 of the body holding part 61 in a cross direction substantially orthogonal to the central axis line CL. In other words, in the present embodiment, the auto body fixing part 62 is integrally formed with the retainer unit 6.

The microphone facing part 63 is a substantially circular cylindrical portion provided corresponding to the ultrasonic microphone 3 in the temporarily assembled state and the installed-in-vehicle state and is disposed at the distal end of the retainer unit 6 in the axial direction. Specifically, the microphone facing part 63 extends from a bottom wall part 612, which closes a distal end portion of the rectangular cylindrical side wall part 611 of the body holding part 61 in the axial direction, toward the distal end in the axial direction. The bottom wall part 612 is a plate-shaped portion crossing the axis, specifically, orthogonal to the axis.

The microphone facing part 63 is disposed outward of the ultrasonic microphone 3 and the cushion member 5 in the radial direction in the temporarily assembled state and the installed-in-vehicle state. In other words, the microphone facing part 63 is disposed so that the sandwiched part 54 of the cushion member 5 is sandwiched between the microphone facing part 63 and the protruding part 31 of the ultrasonic microphone 3 in the temporarily assembled state and the installed-in-vehicle state.

The engagement piece 64 is a tongue-like plate-shaped part and extends along the central axis line CL from the microphone facing part 63 toward the proximal end in the axial direction. In the present embodiment, a pair of engagement pieces 64 are vertically arranged.

The engagement piece 64 includes an engagement part 65. The engagement part 65 is a through-hole and is provided vertically so as to penetrate the engagement piece 64. The engagement part 65 is an engagement hole for engaging with the engagement protrusion 43 provided to the sensor case 42 included in the sensor body 2 and is disposed at a position corresponding to the engagement protrusion 43 in the temporarily assembled state and the installed-in-vehicle state. In other words, the retainer unit 6 is configured to hold the sensor body 2 by the engagement protrusion 43 engaging with the engagement part 65 while housing the sensor body 2 in the inner space of the body holding part 61.

The microphone facing part 63 includes a flange locking part 66. The flange locking part 66 is formed in the shape of a ring protruding inward in the radial direction from a distal end portion of a cylindrical part 631 of the microphone facing part 63 in the axial direction. The cylindrical part 631 is a substantially circular cylindrical portion extending from the bottom wall part 612 along the axis. The flange locking part 66 has substantially the same inner diameter as the outer diameter of the cylindrical part 51 of the cushion member 5. The flange locking part 66 is formed so that the amount of projection in the radial direction is substantially the same as the amount of projection of the flange part 52 of the cushion member 5 in the radial direction.

In other words, the flange locking part 66 is formed so as to come into close contact with a portion of the cylindrical part 51 of the cushion member 5 that corresponds to the sandwiched part 54. Furthermore, the flange locking part 66 is configured to face and abut the flange part 52 of the cushion member 5 along the axis.

A drainage path 67 is formed at a lower end portion of the microphone facing part 63. The drainage path 67 is disposed to penetrate the microphone facing part 63 in the radial direction, i.e., vertically, to allow water to be discharged out of the retainer unit 6 from a gap between the microphone facing part 63 and the cushion member 5.

In the present embodiment, the drainage path 67 is disposed to extend between the microphone facing part 63 and the engagement piece 64. In other words, the drainage path 67 is disposed from the microphone facing part 63 over to a base portion of the engagement piece 64.

In the present embodiment, a distal end portion of the drainage path 67 in the axial direction has an opening 68 which is open along the axis. In other words, the drainage path 67 is formed as a cutout portion resulting from cutting from the side on which the flange locking part 66 is located toward the proximal end in the axial direction. Furthermore, in the present embodiment, the drainage path 67 is formed so that the widthwise dimension, i.e., the horizontal dimension, of the opening is substantially constant along the axis.

Advantageous Effects

Hereinafter, advantageous effects provided by the configuration according to the present embodiment will be described with reference to the drawings.

The microphone facing part 63 of the retainer unit 6 allows the exposed part 53 of the cushion member 5, which is located at the distal end in the axial direction, to be exposed and allows the sandwiched part 54 of the cushion member 5, which is located at the proximal end in the axial direction, to be sandwiched between the microphone facing part 63 of the retainer unit 6 and a portion of the outer peripheral surface 30 of the ultrasonic microphone 3 that corresponds to the protruding part 31. Specifically, the flange locking part 66 disposed at the distal end portion of the microphone facing part 63 in the axial direction comes into close contact with a portion of the cylindrical part 51 that corresponds to the sandwiched part 54. Furthermore, the flange locking part 66 faces and abuts the flange part 52 of the cushion member 5 along the axis, thereby locking onto the sandwiched part 54 of the cushion member 5.

The protruding part 31 of the ultrasonic microphone 3 is covered by the exposed part 53 of the cushion member 5 in close contact therewith and is inserted into the fitting hole V4 of the front grille V3 in the installed-in-vehicle state.

In the installed-in-vehicle state, during rains, in a car wash, or the like, water may enter, from the outside, a portion where the ultrasonic sensor 1 is attached to the front grille V3. Specifically, water may enter the attachment portion from the outside of the vehicle body V1 through a gap between the cushion member 5 and the inner peripheral surface V5 of the fitting hole V4 of the front grille V3.

At the portion where the ultrasonic sensor 1 is attached to the front grille V3, there may be a gap in which incoming water is retained. Such a gap is typically formed between the front grille V3 and/or the retainer unit 6 and the cushion member 5 near the fitting hole V4 of the front grille V3. If incoming water is retained in such a gap, propagation of vibration through the retained water may cause an increase in unnecessary reflected waves, causing trouble such as false detection.

In the ultrasonic sensor 1 configured as described above, for example, a gap in which water can be retained may be formed at a portion where the distal end portion of the flange locking part 66 in the axial direction, the rear surface of the front grille V3, and the outer peripheral surface of the exposed part 53 of the cushion member 5 face one another. Furthermore, a gap in which water can be retained may be formed between the cushion member 5 and the retainer unit 6, specifically, between the cushion member 5 and the microphone facing part 63. Therefore, incoming water may reach these gaps.

However, in the ultrasonic sensor 1 according to the present embodiment, the drainage path 67 is formed in the microphone facing part 63 of the retainer unit 6. The drainage path 67 penetrates the microphone facing part 63 in the radial direction, i.e., vertically, to allow water to be discharged out of the retainer unit 6 from the gap between the retainer unit 6 and the cushion member 5. In other words, the drainage path 67 is formed so as to connect the gap formed between the retainer unit 6 and the cushion member 5 and the space formed below the ultrasonic sensor 1. Thus, water that has reached the gap between the retainer unit 6 and the cushion member 5 is discharged into the space below the ultrasonic sensor 1 through the drainage path 67.

Furthermore, in the ultrasonic sensor 1 according to the present embodiment, the drainage path 67 is provided so as to extend between the microphone facing part 63 and the engagement piece 64. Thus, water that has reached the gap between the retainer unit 6 and the cushion member 5 is favorably discharged into the space below the ultrasonic sensor 1 through the drainage path 67.

Furthermore, with the opening 68 open along the axis, the drainage path 67 is formed as a cutout portion resulting from cutting from the side on which the flange locking part 66 is located toward the proximal end in the axial direction. Thus, water that has reached the gap formed at the portion where the distal end portion of the flange locking part 66 in the axial direction, the rear surface of the front grille V3, and the outer peripheral surface of the exposed part 53 of the cushion member 5 face one another is favorably discharged into the space below the ultrasonic sensor 1 through the drainage path 67.

As described above, in the ultrasonic sensor 1 according to the present embodiment, incoming water can be maximally kept from being retained in the gap formed at the portion where the ultrasonic sensor 1 is attached to the front grille V3. Therefore, with this configuration, degradation in the performance of the in-vehicle ultrasonic sensor that is caused by infiltration of water due to rain or the like can be sufficiently suppressed.

In the case of attaching the ultrasonic sensor 1 to the bumper V2, as described in PTL 1, a rib for fixing the sensor can be provided on an inner surface, i.e., a rear surface, of the bumper V2, and a drainage hole can be provided in the rib, to optimally reduce the aforementioned problems. However, in the case of attaching the ultrasonic sensor 1 to the front grille V3, providing the above rib and drainage hole in the front grille V3 is difficult from the design or structural perspective.

In this regard, in the present embodiment, the drainage path 67 is provided not in the front grille V3, but in the retainer unit 6 which is a component for attaching the sensor body 2 to the front grille V3. Therefore, with this configuration, even for an auto body component having intricately-shaped continuous surfaces having relatively small areas, represented by the front grille V3, a good water removal measure can be applied with a simple structure.

Modifications

The present disclosure is not limited to the above-described embodiment. Therefore, the above-described embodiment can be changed, as appropriate. Representative modifications will be described below. In the following description of the modifications, differences from the above-described embodiment will be mainly described. In the above-described embodiment and the modifications, the same or equivalent portions are assigned the same reference signs. Thus, in the following description of the modifications, the preceding description in the above-described embodiment can be applied, as appropriate, to a structural element having the same reference sign as that in the above-described embodiment unless there is a technical inconsistency or any additional description is given.

The present disclosure is not limited to the embodiment in which the ultrasonic sensor 1 is attached to the front grille V3. In other words, the configuration according to the above-described embodiment can be optimally applied to an embodiment in which the ultrasonic sensor 1 is attached to the bumper V2. Furthermore, the configuration according to the above-described embodiment can be optimally applied to an embodiment in which the ultrasonic sensor 1 is attached to an auto body panel. In the case of attaching the ultrasonic sensor 1 to the bumper V2 or the auto body panel, the configuration of the retainer unit 6 may be changed, as appropriate, according to an object to which the ultrasonic sensor 1 is attached.

The ultrasonic sensor 1 is not limited to a configuration capable of transmitting and receiving ultrasonic waves. In other words, for example, the ultrasonic sensor 1 may be configured to be only capable of transmitting ultrasonic waves. Alternatively, the ultrasonic sensor 1 may have only the function of receiving waves reflected from an object located near the vehicle V that are probe waves in the form of ultrasonic waves transmitted from another ultrasonic sensor 1.

The configurations of the sensor body 2, the cushion member 5, and the retainer unit 6 are not limited to the specific examples described in the above embodiment. In other words, details of the configurations of the sensor body 2, the cushion member 5, and the retainer unit 6 can be changed, as appropriate, within a range in which the effects provided according to the present disclosure are not lessened.

The shape of the drainage path 67 is not limited to the above-described specific example. In other words, for example, the width of the drainage path 67 does not need to be substantially constant along the axis. Furthermore, the drainage path 67 is not required to have the opening 68 at the distal end in the axial direction.

Figure 4:
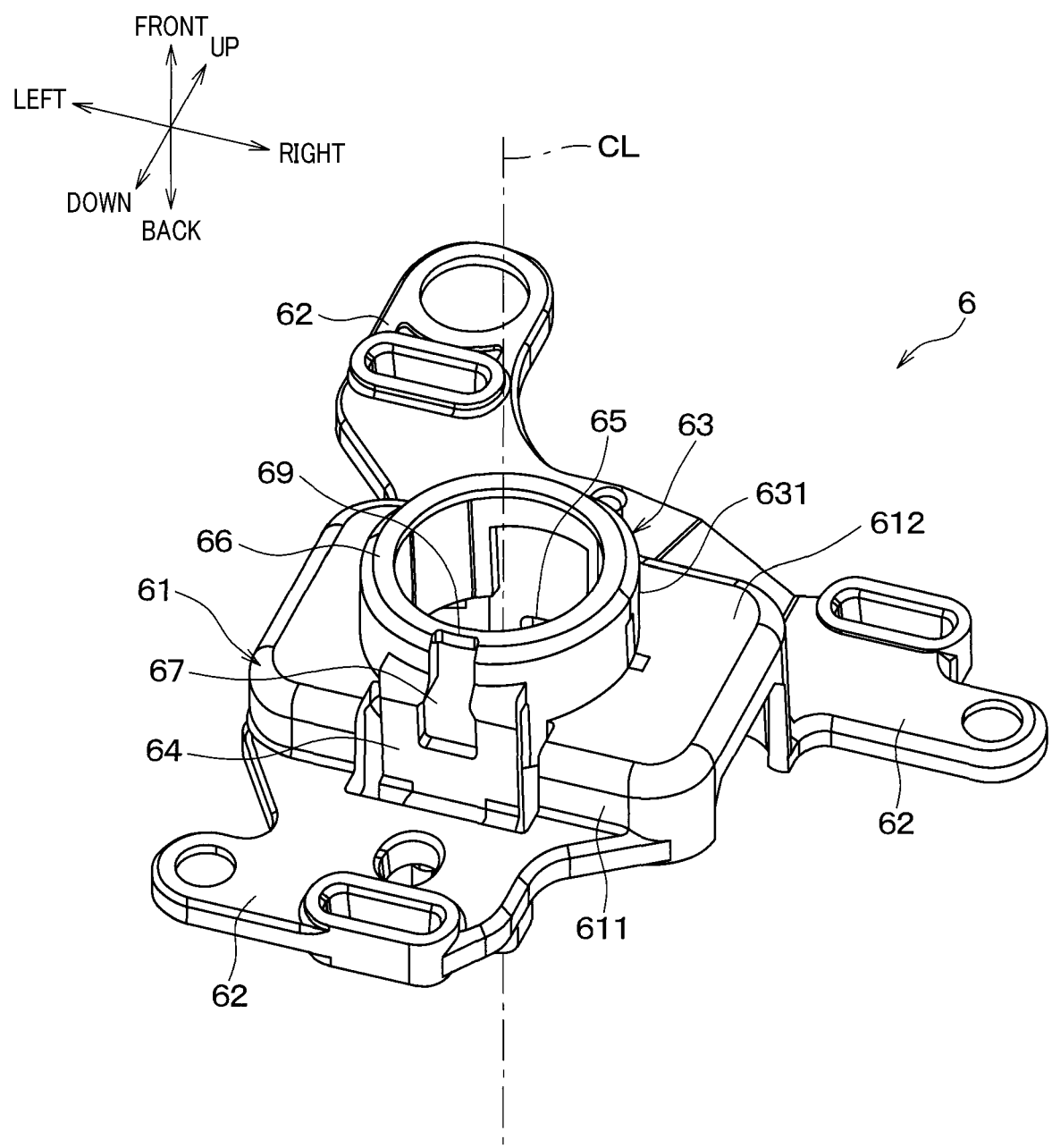
FIG. 4 is a perspective view illustrating an external appearance of a retainer unit according to one modification.

FIG. 4 illustrates one modification of the retainer unit 6 according to the embodiment illustrated in FIG. 3. As illustrated in FIG. 4, the distal end portion of the drainage path 67 in the axial direction may be closed by a bridge portion 69 provided to the microphone facing part 63. In other words, the drainage path 67 may be a through-hole provided at the distal end of the retainer unit 6 in the axial direction. With such a configuration, the strength of the microphone facing part 63 can be improved while maintaining favorable drainage performance resulting from the drainage path 67 being provided to extend between the microphone facing part 63 and the engagement piece 64. Note that in this case, the drainage path 67 may be divided into two or more portions in the axial direction. This means that more than one bridge portion 69 may be provided.

Furthermore, in the configuration illustrated in FIG. 4, the drainage path 67 is formed so that the width of the drainage path 67 in the engagement piece 64 is greater than the width of the drainage path 67 in the microphone facing part 63. This enables the flange locking part 66 to more securely lock onto the cushion member 5 while maintaining favorable drainage performance.

Figure 5:
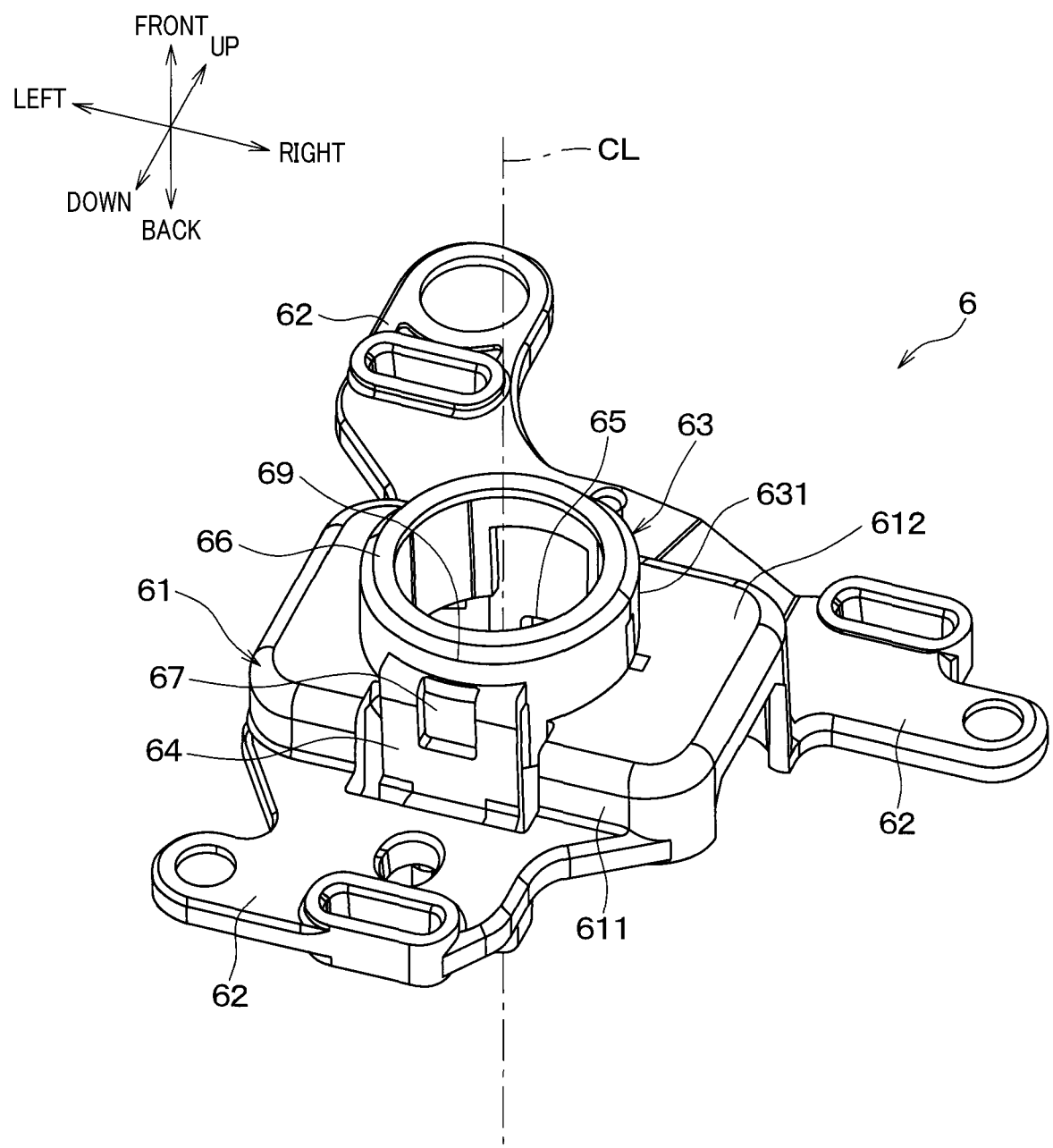
FIG. 5 is a perspective view illustrating an external appearance of a retainer unit according to another modification.

The drainage path 67 may be provided only in one of the microphone facing part 63 and the engagement piece 64. FIG. 5 illustrates an example configuration of the retainer unit 6 when the drainage path 67 is provided only to the engagement piece 64. With such a configuration, the strength of the microphone facing part 63 can be improved while maintaining favorable performance of drainage from the gap between the retainer unit 6 and the cushion member 5.

In the above-described embodiment, etc., the drainage path 67 is provided at the same position as the engagement piece 64 in a circumferential direction surrounding the central axis line CL. The circumferential direction extends along the circumference of a circle, drawn on a plane having the central axis line CL as a normal thereto, centered on the intersection between the plane and the central axis line CL. However, the present disclosure is not limited to such an embodiment.

Figure 6:
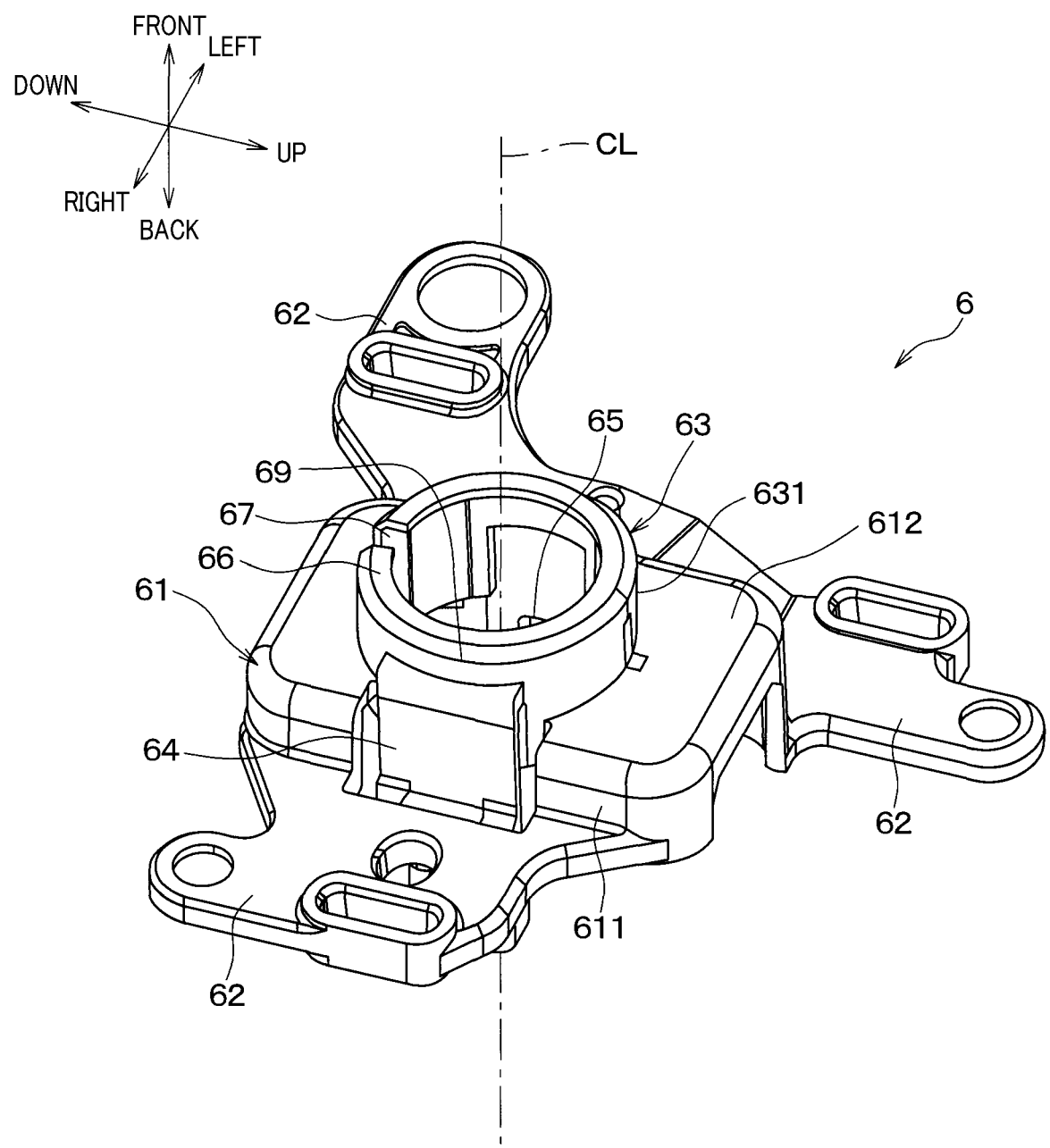
FIG. 6 is a perspective view illustrating an external appearance of a retainer unit according to yet another variation.

Specifically, as illustrated in FIG. 6, the drainage path 67 may be provided to the microphone facing part 63, at a position different from the position of the engagement piece 64 in the circumferential direction. In this case, a pair of engagement pieces 64 are horizontally arranged. Such a configuration allows optimal reduction in the trouble resulting from providing the drainage path 67 only to the engagement piece 64 located on the lower side, in other words, the occurrence of the engagement force between the pair of engagement pieces 64 becoming unbalanced.

Note that in the configuration in FIG. 6, the positional relationship between the engagement piece 64 and the drainage path 67 in the circumferential direction is not limited. Specifically, FIG. 6 illustrates a typical example in which the distance between the engagement piece 64 and the drainage path 67 in the circumferential direction is one-fourth of the circumference of the circle defining said circumferential direction. However, the present disclosure is not limited to such a typical example. For example, the distance between the engagement piece 64 and the drainage path 67 in the circumferential direction may be one-eighth to one-third of the circumference of the circle defining said circumferential direction.

Furthermore, in the configuration in FIG. 6, the distal end portion of the drainage path 67 in the axial direction may be closed, as illustrated in FIG. 4 or 5.

Combining the configurations in FIG. 3 to 5 and the configuration in FIG. 6 results in a configuration in which the drainage path 67 is provided in two places, specifically, a position corresponding to the engagement piece 64 and a position different from the position of the engagement piece 64 in the circumferential direction. With such a configuration, the degree of flexibility for attaching the retainer unit 6 improves. Specifically, attaching the retainer unit 6 to the vehicle body V1 in such a manner that one of the drainage path 67 provided at the position corresponding to the engagement piece 64 and the drainage path 67 provided at a position different from the position of the engagement piece 64 is on the lower side can result in a high level of drainage.

In the above-described embodiment, etc., at the distal end relative to the bottom wall part 612 in the axial direction, the engagement piece 64 extends from the cylindrical part 631 toward the proximal end in the axial direction. In other words, a fixed end of the engagement piece 64 that is a portion joined to the microphone facing part 63 is provided at the distal end (i.e., forward) relative to the bottom wall part 612 in the axial direction. However, the present disclosure is not limited to such an embodiment. Specifically, for example, the fixed end of the engagement piece 64 may be located at the proximal end (i.e., backward) relative to the bottom wall part 612 in the axial direction.

The drainage path 67 may be formed so that the width of the drainage path 67 in the microphone facing part 63 is greater than the width of the drainage path 67 in the engagement piece 64. Alternatively, the drainage path 67 may be formed so as to have the greatest width in the opening 68. Such a configuration allows very good drainage through the gap formed at the portion where the ultrasonic sensor 1 is attached to the front grille V3.

Figure 7:
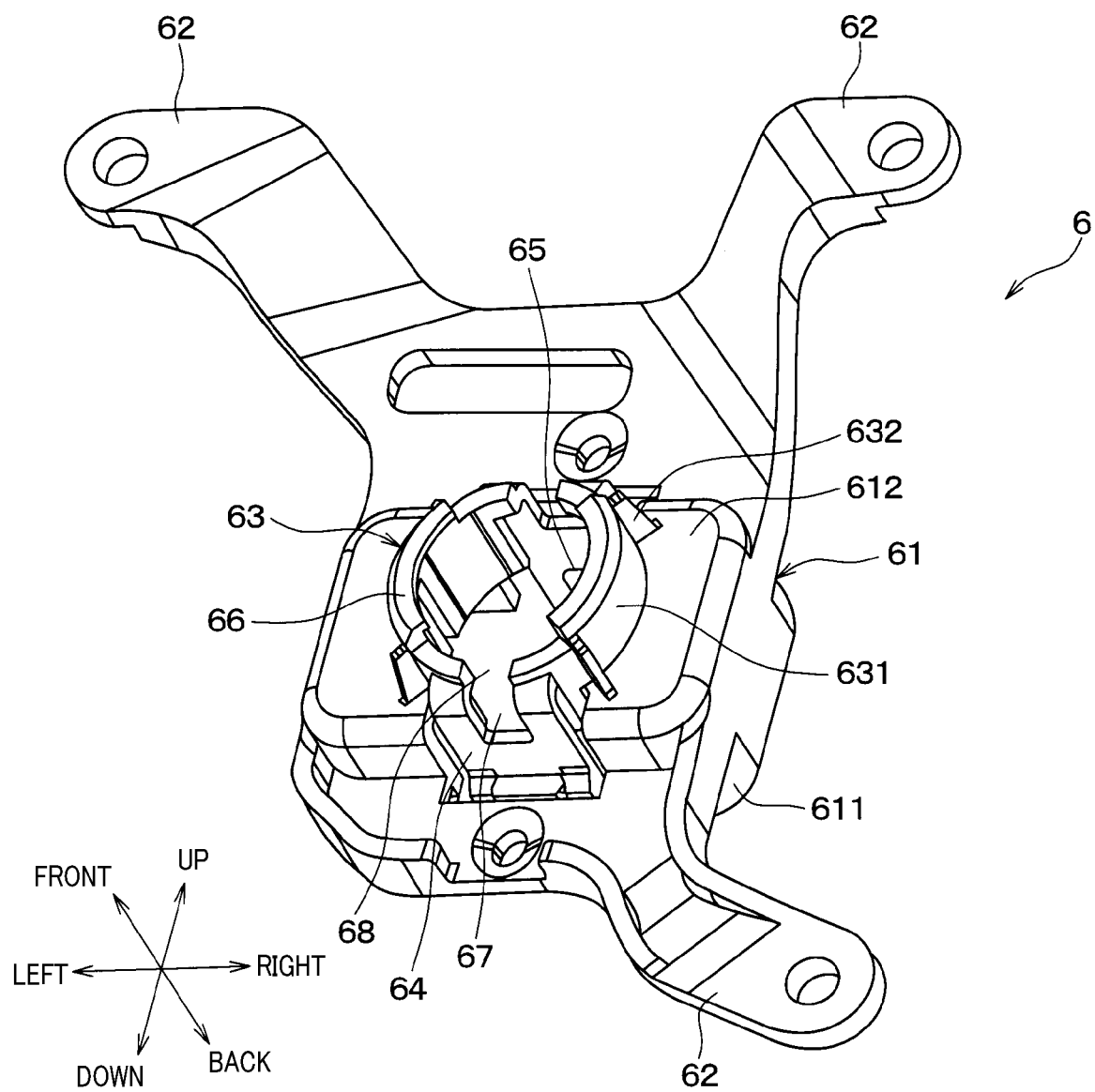
FIG. 7 is a perspective view illustrating an external appearance of a retainer unit according to yet another variation.
Figure 8:
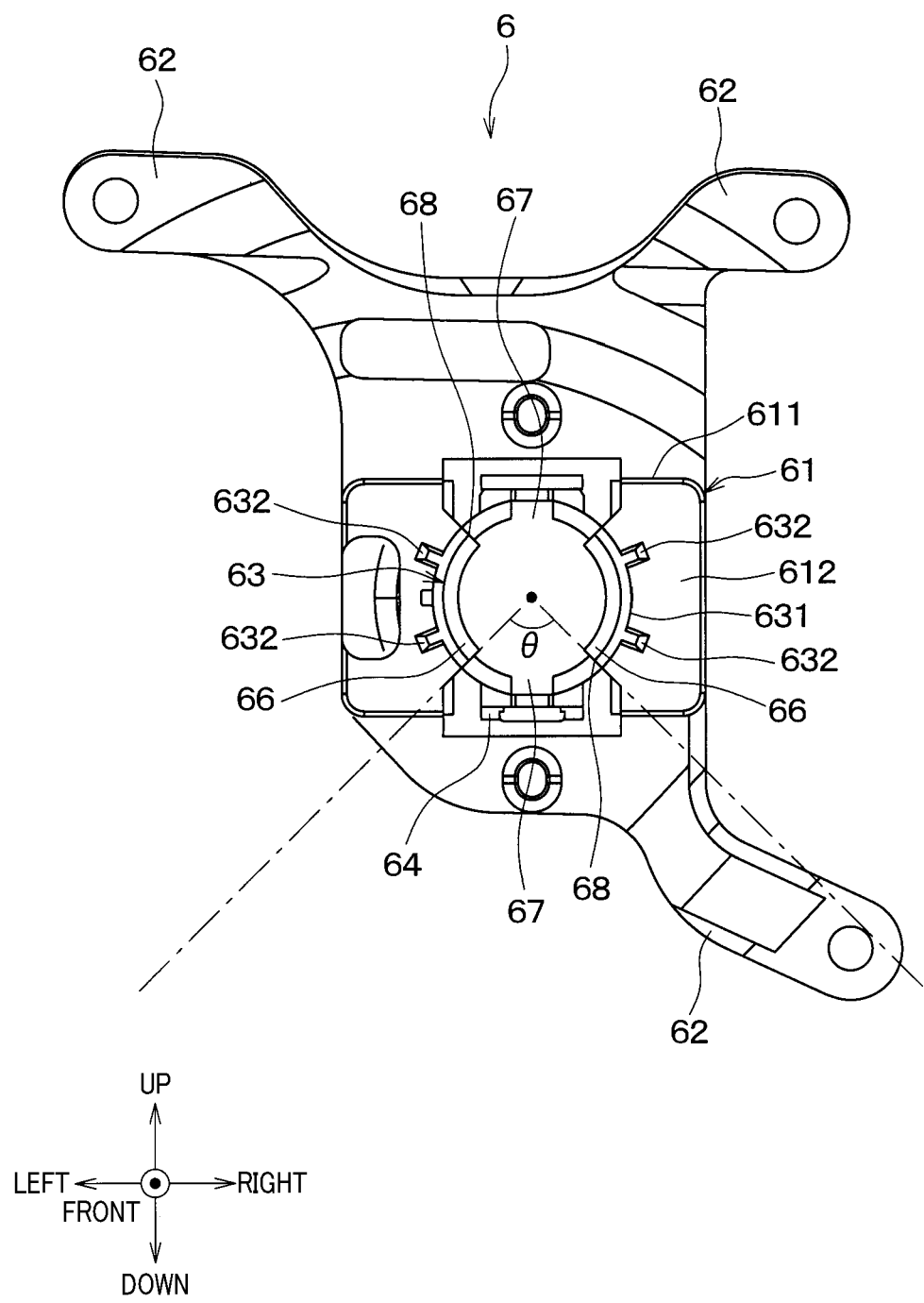
FIG. 8 is a plan view of the retainer unit illustrated in FIG. 7.

FIGS. 7 and 8 illustrate examples in which the drainage path 67 is formed to have a greater width at the distal end than at the proximal end in the axial direction. Note that the configurations illustrated in FIGS. 7 and 8 and the configurations illustrated in FIGS. 3 to 6 are different in detail. However, these are not substantially different in the function of the retainer unit 6. Therefore, portions in these configurations that are construed as substantially the same structural elements as a result of having the same or equivalent function or structure are assigned the same reference signs. Hereinafter, the configuration according to the present modification will be described mainly with reference to FIGS. 7 and 8.

In the present modification, the microphone facing part 63 includes the cylindrical part 631 and the flange locking part 66, as in the configurations illustrated in FIGS. 3 to 6. The cylindrical part 631 is a substantially circular cylindrical portion extending along the axis. The flange locking part 66 protrudes inward in the radial direction from a distal end portion of the cylindrical part 631 in the axial direction. The flange locking part 66 is configured to lock onto the cushion member 5 by coming into close contact with the cushion member 5.

In the present variation, the drainage path 67 is provided to the cylindrical part 631 and the flange locking part 66, as in the configuration illustrated in FIG. 3. Furthermore, with the opening 68 at the distal end in the axial direction, the drainage path 67 is provided so as to cut the flange locking part 66 in a circumferential direction.

Meanwhile, in the present variation, the drainage path 67 is formed so that the width of the drainage path 67 on the flange locking part 66 side is greater than the width of the drainage path 67 on the cylindrical part 631 side. Specifically, the drainage path 67 has the greatest width at the flange locking part 66. Specifically, as illustrated in FIG. 8, the drainage path 67 in the flange locking part 66 is formed to have such a width that a center angle θ is between 20 degrees and 90 degrees, inclusive, in a plan view. On other hand, the drainage path 67 at a fixed end portion of the engagement piece 64 has the least width and is constant in width in a side view. The drainage path 67 in the cylindrical part 631 has the aforementioned greatest width at the distal end in the axial direction. Furthermore, the drainage path 67 in the cylindrical part 631 has the aforementioned least width at a portion where the drainage path 67 in the cylindrical part 631 is connected to the drainage path 67 in the engagement piece 64. Furthermore, the drainage path 67 in the cylindrical part 631 is formed so as to expand in width stepwise from the aforementioned least width toward the greatest width.

In such a configuration, the flange locking part 66 is provided having a predetermined width in the circumferential direction to lock onto the cushion member 5 in the horizontal direction in the installed state. Thus, with the flange locking part 66, the cushion member 5 can be reliably retained in the horizontal direction.

Meanwhile, the drainage path 67 is provided so as to open downward with a relatively large width in the installed-in-vehicle state. Therefore, in the installed-in-vehicle state, regardless of the shape of the front grille V3, clearance through which water that has reached the gap between the retainer unit 6 and the cushion member 5 can be discharged downward is optimally formed between the front grille V3 and the retainer unit 6. Thus, water that has reached the gap formed between the distal end portion of the flange locking part 66 in the axial direction, the rear surface of the front grille V3, and the outer peripheral surface of the exposed part 53 of the cushion member 5 face one another is favorably discharged into the space below the ultrasonic sensor 1 through the drainage path 67.

Furthermore, in the present modification, the drainage path 67 is provided as a pair with the central axis line CL therebetween. Specifically, the pair of drainage paths 67 is vertically symmetrical with respect to the central axis line CL in the installed-in-vehicle state. With such a configuration, the degree of flexibility for attaching the retainer unit 6 improves. Specifically, attaching the retainer unit 6 to the vehicle body V1 in such a manner that one of the pair of drainage paths 67 is on the lower side can result in a high level of drainage.

Unlike the configurations illustrated in FIGS. 3 to 6, in the present modification, the flange locking part 66 includes the drainage paths 67 at both the upper end and the lower end in the installed-in-vehicle state. In other words, in the microphone facing part 63, a pair of flange locking parts 66 separated by the pair of vertically arranged drainage paths 67 are horizontally arranged. With such a configuration, the flange locking part 66 locks onto the cushion member 5 more evenly in the circumferential direction. This allows optimal reduction in problems of the cushion member 5 deforming at the position of the drainage path 67 and separating from the outer peripheral surface of the ultrasonic microphone 3.

Furthermore, in the present modification, the drainage path 67 is provided in each of the pair of the vertically arranged engagement pieces 64. Such a configuration allows optimal reduction in the occurrence of the engagement force between the pair of engagement pieces 64 becoming unbalanced as a result of providing the drainage path 67 only in the engagement piece 64 located on the lower side.

Furthermore, in the present modification, a reinforcement rib 632 is provided to the cylindrical part 631. The reinforcement rib 632 protrudes outward in the radial direction and extends from the bottom wall part 612 along the axis. In other words, the reinforcement rib 632 is integrally joined to both the bottom wall part 612 and the cylindrical part 631.

With such a configuration, the reinforcement rib 632 reinforces the microphone facing part 63 and the flange locking part 66 in a favorable manner. Specifically, the microphone facing part 63 can be optimally suppressed from deforming in such a manner as to open outward with a pressing force applied from the inside of the microphone facing part 63 in the state where the retainer unit 6 is attached to an assembly of the sensor body 2 and the cushion member 5. Therefore, even in the case where the drainage path 67 is formed to have a great width to increase the level of drainage, the cushion member 5 can be retained well. Alternatively, even in the case where a pair of upper and lower drainage paths 67 is formed, the cushion member 5 can be retained well.

Note that the number of reinforcement ribs 632 to be installed is not limited. Specifically, in the example illustrated in FIGS. 7 and 8, two reinforcement ribs 632 are provided to each of the pair of left and right flange locking parts 66. However, the present disclosure is not limited to such an embodiment.

Figure 9:
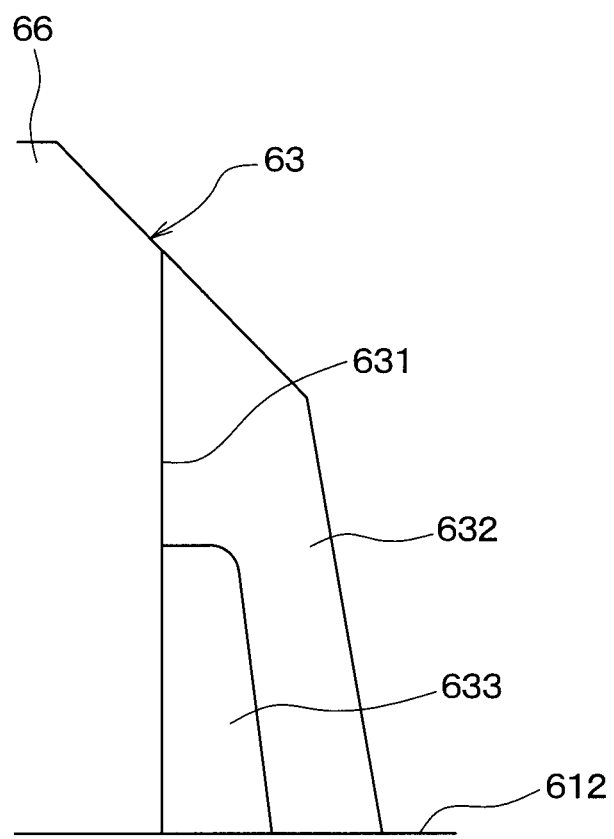
FIG. 9 is a magnified side view illustrating the configuration of one modification of a reinforcement rib illustrated in FIGS. 7 and 8.

Furthermore, as illustrated in FIG. 9, the reinforcement rib 632 may have a through-hole 633. The through-hole 633 is provided at a base portion of the reinforcement rib 632 in such a manner as to penetrate, in the thickness direction, the plate-shaped reinforcement rib 632 having a thickness along the circumferential direction. The base portion of the reinforcement rib 632 is a proximal end portion of the reinforcement rib 632, which extends along the axis, in the axial direction and is a portion where the reinforcement rib 632 is joined to the bottom wall part 612. This optimally reduces the occurrence of water staying at the base portion of the reinforcement rib 632.

Two or more seamlessly and integrally formed structural elements in the above description may be formed by bonding separate members to each other. Likewise, two or more structural elements formed by bonding separate members to each other in the above description may be seamlessly and integrally formed.

Two or more structural elements formed from the same material in the above description may be formed from different materials. Likewise, two or more structural elements formed from different materials in the above description may be formed from the same material.

It goes without saying that the elements included in the above-described embodiment are not necessarily indispensable unless otherwise indicated in particular or considered obviously indispensable in principle, for example. Furthermore, when the numerical figures, such as the number, numerical values, amount, range, etc., of structural elements are mentioned, the present disclosure is not limited to these specific numerical figures unless indicated as required in particular or obviously limited in principle to a specific figure, for example. Likewise, when the shape, direction, positional relationship, etc., of the structural elements and the like are mentioned, the present disclosure is not limited to these shape, direction, positional relationship, etc., unless indicated as required in particular or limited in principle to a specific shape, direction, positional relationship, etc., for example.

The modification is not limited to the above-described example. Furthermore, two or more modifications can be combined together. Moreover, the entirety or a portion of the above-described embodiment and the entirety or a portion of the modification can be combined together.

Hereinafter, aspects of the above-described embodiments will be summarized.

An ultrasonic sensor (1) is configured to be attached to an auto body component (V3).

According to one aspect of the present disclosure, this ultrasonic sensor includes:

a sensor body (2) including an ultrasonic microphone (3) having a columnar shape and extending along an axial direction parallel to a central axis line (CL) and a microphone support unit (4) which allows a protruding part (31) of the ultrasonic microphone to protrude and supports a supported part (32) of the ultrasonic microphone, the protruding part being located at a distal end in the axial direction, the supported part being located at a proximal end in the axial direction;

a cushion member (5) provided to cover the protruding part of the ultrasonic microphone and formed in a cylindrical shape from a synthetic resin-based elastic material;

a retainer unit (6) provided outward of the ultrasonic microphone in a radial direction extending from the central axis line, the retainer unit being configured so that an exposed part (53) of the cushion member is exposed and a sandwiched part (54) of the cushion member is sandwiched between the retainer unit and an outer peripheral surface (30) of the protruding part of the ultrasonic microphone, the exposed part being located at the distal end in the axial direction, the sandwiched part being located at the proximal end in the axial direction; and a drainage path (67) penetrating the retainer unit in the radial direction to allow water to be discharged out of the retainer unit from a gap between the retainer unit and the cushion member.

A retainer (6) corresponds to the retainer unit. In other words, the retainer is a component for attaching and fixing, to an auto body component (V3), an ultrasonic sensor (1) including a sensor body (2) in which an ultrasonic microphone (3) having a columnar shape and extending in an axial direction parallel to a central axis line (CL) protrudes toward a distal end thereof in the axial direction.

According to one aspect of the present disclosure, this retainer includes:

a microphone facing part (63) corresponding to the ultrasonic microphone and formed in a cylindrical shape extending along the axis toward the distal end in the axial direction;

an engagement piece (64) which is a plate-shaped part extending along the central axis line from the microphone facing part toward a proximal end in the axial direction, the engagement piece including an engagement part (65) which engages the sensor body; and a drainage path (67) provided in one of the microphone facing part or the engagement piece and penetrating the one of the microphone facing part and the engagement piece in a radial direction to allow water to be discharged out of the retainer.

In the ultrasonic sensor, the gap can be formed between the retainer unit and the cushion member. A state where the ultrasonic sensor is attached to the auto body component is referred to as being installed-in-vehicle state. In the installed-in-vehicle state, if incoming water is retained in the gap, the propagation of vibration through the retained water may cause an increase in unnecessary reflected waves, causing trouble such as false detection.

In this regard, in the ultrasonic sensor configured as described above, the retainer unit includes the drainage path. The drainage path penetrates the retainer unit in the radial direction to allow water to be discharged out of the retainer unit from the gap. Therefore, incoming water can be maximally suppressed from being retained in the gap. Therefore, with this configuration, degradation in the performance of the in-vehicle ultrasonic sensor that is caused by infiltration of water due to rain or the like can be sufficiently suppressed.

What is claimed is:

1. An ultrasonic sensor configured to be attached to an auto body component, the ultrasonic sensor comprising:
a sensor body including an ultrasonic microphone having a columnar shape and extending along an axial direction parallel to a central axis line and a microphone support unit which allows a protruding part of the ultrasonic microphone to protrude and supports a supported part of the ultrasonic microphone, the protruding part being located at a distal end in the axial direction, the supported part being located at a proximal end in the axial direction;
a cushion member provided to cover the protruding part of the ultrasonic microphone and formed in a cylindrical shape from a synthetic resin-based elastic material;
a retainer unit provided outward of the ultrasonic microphone in a radial direction extending from the central axis line, the retainer unit being configured so that an exposed part of the cushion member is exposed and a sandwiched part of the cushion member is sandwiched between the retainer unit and an outer peripheral surface of the protruding part of the ultrasonic microphone, the exposed part being located at the distal end in the axial direction, the sandwiched part being located at the proximal end in the axial direction; and
a drainage path penetrating the retainer unit in the radial direction to allow water to be discharged out of the retainer unit from a gap between the retainer unit and the cushion member, wherein
the retainer unit includes: a microphone facing part corresponding to the ultrasonic microphone and formed in a cylindrical shape; and an engagement piece which is a plate-shaped part extending along the central axis line from the microphone facing part toward the proximal end in the axial direction, the engagement piece including an engagement part which engages the sensor body, and
the drainage path is provided to one of the microphone facing part and the engagement piece.

2. The ultrasonic sensor according to claim 1, wherein
the microphone facing part extends from a bottom wall part toward the distal end in the axial direction, the bottom wall part crossing the central axis line, and
at the distal end relative to the bottom wall part in the axial direction, the engagement piece extends from the microphone facing part toward the proximal end in the axial direction.

3. The ultrasonic sensor according to claim 1, wherein
the drainage path is provided to the microphone facing part, at a position different from a position of the engagement piece in a circumferential direction around the central axis line.

4. The ultrasonic sensor according to claim 1, wherein an end portion of the drainage path in the axial direction has an opening which is open along the central axis line.

5. The ultrasonic sensor according to claim 4, wherein the microphone facing part includes: a cylindrical part which is a substantially circular cylindrical portion extending along the central axis line; and a locking part protruding inward in the radial direction from a distal end portion of the cylindrical part in the axial direction to lock onto the cushion member by coming into close contact with the cushion member,
the drainage path is provided to the cylindrical part and the locking part, and
the drainage path is formed having a width greater in the locking part than in the cylindrical part.

6. The ultrasonic sensor according to claim 5, wherein the microphone facing part extends from a bottom wall part toward the distal end in the axial direction, the bottom wall part crossing the central axis line, and
the cylindrical part includes a reinforcement rib protruding outward in the radial direction and extending from the bottom wall part along the central axis line.

7. The ultrasonic sensor according to claim 6, wherein the reinforcement rib has a through-hole.

8. The ultrasonic sensor according to claim 1, wherein an end portion of the drainage path in the axial direction is closed by the microphone facing part.

9. The ultrasonic sensor according to claim 1, wherein the sensor body is formed in a shape of a stepped column in which the ultrasonic microphone is a reduced diameter portion, and
the cushion member is configured to be sandwiched between the outer peripheral surface of the ultrasonic microphone and an inner peripheral surface of a fitting hole when a distal end portion of the ultrasonic microphone in the axial direction is inserted into the fitting hole, the fitting hole being a through-hole formed in the auto body component.

10. The ultrasonic sensor according to claim 1, further comprising an auto body fixing part extending in a cross direction so that the ultrasonic sensor is fixed to the auto body component upon attachment to the auto body component, the cross direction crossing the central axis line, wherein
the auto body fixing part and the retainer unit are integrally formed.

11. The ultrasonic sensor according to claim 1, wherein the auto body component is a front grille.

12. A retainer which is a component for attaching and fixing, to an auto body component, an ultrasonic sensor including a sensor body in which an ultrasonic microphone having a columnar shape and extending along an axial direction parallel to a central axis line protrudes toward a distal end in the axial direction, the retainer comprising:
a microphone facing part corresponding to the ultrasonic microphone and formed into a cylindrical shape extending along the central axis line toward the distal end in the axial direction;
an engagement piece which is a plate-shaped part extending along the central axis line from the microphone facing part toward a proximal end in the axial direction, the engagement piece including an engagement part which engages the sensor body; and
a drainage path provided in one of the microphone facing part or the engagement piece and penetrating the one of the microphone facing part and the engagement piece in a radial direction extending from the central axis line to allow water to be discharged out of the retainer, wherein
the drainage path is provided to the microphone facing part, at a position different from a position of the engagement piece in a circumferential direction around the central axis line.

13. The retainer according to claim 12, wherein the engagement piece extends from the microphone facing part toward the proximal end in the axial direction.

14. The retainer according to claim 12, wherein an end portion of the drainage path in the axial direction is closed by the microphone facing part.

15. The retainer according to claim 12, wherein the microphone facing part extends from a bottom wall part toward the distal end in the axial direction, the bottom wall part crossing the central axis line, and
at the distal end relative to the bottom wall part in the axial direction, the engagement piece extends from the microphone facing part toward the proximal end in the axial direction.

16. The retainer according to claim 12, further comprising an auto body fixing part extending in a cross direction so that the ultrasonic sensor is fixed to the auto body component upon attachment to the auto body component, the cross direction crossing the central axis line.

17. The retainer according to claim 12, wherein the auto body component is a front grille.

18. A retainer which is a component for attaching and fixing, to an auto body component, an ultrasonic sensor including a sensor body in which an ultrasonic microphone having a columnar shape and extending along an axial direction parallel to a central axis line protrudes toward a distal end in the axial direction, the retainer comprising:
a microphone facing part corresponding to the ultrasonic microphone and formed into a cylindrical shape extending along the central axis line toward the distal end in the axial direction;
an engagement piece which is a plate-shaped part extending along the central axis line from the microphone facing part toward a proximal end in the axial direction, the engagement piece including an engagement part which engages the sensor body; and
a drainage path provided in one of the microphone facing part or the engagement piece and penetrating the one of the microphone facing part and the engagement piece in a radial direction extending from the central axis line to allow water to be discharged out of the retainer, wherein
an end portion of the drainage path in the axial direction has an opening which is open along the central axis line.

19. A retainer which is a component for attaching and fixing, to an auto body component, an ultrasonic sensor including a sensor body in which an ultrasonic microphone having a columnar shape and extending along an axial direction parallel to a central axis line protrudes toward a distal end in the axial direction, the retainer comprising:
a microphone facing part corresponding to the ultrasonic microphone and formed into a cylindrical shape extending along the central axis line toward the distal end in the axial direction;
an engagement piece which is a plate-shaped part extending along the central axis line from the microphone facing part toward a proximal end in the axial direction, the engagement piece including an engagement part which engages the sensor body; and a drainage path provided in one of the microphone facing part or the engagement piece and penetrating the one of the microphone facing part and the engagement piece in a radial direction extending from the central axis line to allow water to be discharged out of the retainer, wherein the microphone facing part includes: a cylindrical part which is a substantially circular cylindrical portion extending along the central axis line; and a locking part protruding inward in the radial direction from a distal end portion of the cylindrical part in the axial direction, and the drainage path is provided to the cylindrical part or to the cylindrical part and the locking part.

20. The retainer according to claim 19, wherein a cushion member is attached to the sensor body, the cushion member being formed in a cylindrical shape from a synthetic resin-based elastic material and covering the ultrasonic microphone, the locking part is provided to lock onto the cushion member by coming into close contact with the cushion member, and the drainage path is provided to allow water to be discharged out of the retainer from a gap between the microphone facing part and the cushion member.

21. The retainer according to claim 20, wherein the sensor body is formed in a shape of a stepped column in which the ultrasonic microphone is a reduced diameter portion, and the cushion member is configured to be sandwiched between an outer peripheral surface of the ultrasonic microphone and an inner peripheral surface of a fitting hole when a distal end portion of the ultrasonic microphone in the axial direction is inserted into the fitting hole, the fitting hole being a through-hole formed in the auto body component.

22. The retainer according to claim 19, wherein the drainage path is provided to the cylindrical part and the locking part, and the drainage path is formed having a width greater in the locking part than in the cylindrical part.

23. The retainer according to claim 19, wherein the cylindrical part includes a reinforcement rib protruding outward in the radial direction and extending from a bottom wall part along the central axis line.

24. The retainer according to claim 23, wherein the reinforcement rib has a through-hole.

* * * * *